United States Patent
Fukumoto

(10) Patent No.: US 10,649,432 B2
(45) Date of Patent: May 12, 2020

(54) NUMERICAL CONTROLLER WITH PROGRAM CHECK FUNCTION BY OVERRIDE SWITCH

(71) Applicant: FANUC CORPORATION, Minamitsuru-gun, Yamanashi (JP)

(72) Inventor: Akinobu Fukumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 242 days.

(21) Appl. No.: 15/292,751

(22) Filed: Oct. 13, 2016

(65) Prior Publication Data
US 2017/0108843 A1    Apr. 20, 2017

(30) Foreign Application Priority Data
Oct. 15, 2015    (JP) .................................. 2015-203656

(51) Int. Cl.
G05B 19/042    (2006.01)
G05B 19/409    (2006.01)

(52) U.S. Cl.
CPC ....... G05B 19/0428 (2013.01); G05B 19/409 (2013.01); G05B 2219/23065 (2013.01);
(Continued)

(58) Field of Classification Search
CPC ... B60R 25/241; B60R 25/305; B60R 25/104; B60R 25/31; B60R 25/102; B60R 25/25;
(Continued)

(56) References Cited

U.S. PATENT DOCUMENTS 4,510,427 A * 4/1985 Nozawa ................. G05B 19/40
    318/443
4,692,872 A * 9/1987 Kiya .................. G05B 19/4147
    318/569
(Continued)

FOREIGN PATENT DOCUMENTS

CN        1323411 A    11/2001
CN      104570920 A     4/2015
(Continued)

OTHER PUBLICATIONS

Notification of Reasons for Refusal for Japanese Application No. 2015-203656, dated Oct. 31, 2017, including English translation, 5 pages.
(Continued)

*Primary Examiner* — Christopher E. Everett
*Assistant Examiner* — Mohammed Shafayet
(74) *Attorney, Agent, or Firm* — RatnerPrestia

(57) ABSTRACT

A numerical controller of the present invention is provided with an override input unit configured to accept an operation for an override value by an operator, an override monitoring unit configured to detect the operation for the override value by the override input unit and output a notification based on the detected operation, and an execution block control unit configured to control suspension and resumption of run based on the notification output from the override monitoring unit. The override monitoring unit outputs a notification of an end-point stop request if a first operation pattern is detected from the override input unit during the run, and the execution block control unit performs control for suspending the run at the end point of a currently running block of a machining program on receiving the notification of the end-point stop request.

5 Claims, 7 Drawing Sheets

(52) U.S. Cl.
CPC ............. *G05B 2219/33007* (2013.01); *G05B 2219/36094* (2013.01)

(58) Field of Classification Search
CPC ............ B60R 25/10; B60R 2025/1016; B60R 25/252; B60R 25/24; B60R 25/04; B60K 35/00
USPC .......................................................... 700/32
See application file for complete search history.

(56) References Cited

U.S. PATENT DOCUMENTS

| | | | | |
|---|---|---|---|---|
| 4,698,773 | A * | 10/1987 | Jeppsson | G05B 19/182 318/571 |
| 4,982,335 | A * | 1/1991 | Isobe | G05B 19/408 700/159 |
| 5,291,416 | A * | 3/1994 | Hutchins | G05B 19/4184 700/174 |
| 5,682,319 | A * | 10/1997 | Boland | G05B 19/4068 318/573 |
| 5,852,276 | A * | 12/1998 | Yamazaki | B23K 26/0853 219/121.62 |
| 6,311,110 | B1 * | 10/2001 | Ivers | F16F 9/48 280/5.501 |
| 6,317,646 | B1 * | 11/2001 | de Caussin | G05B 19/40937 700/173 |
| 6,404,420 | B1 | 6/2002 | Klein et al. | |
| 6,476,575 | B1 | 11/2002 | Fainstein et al. | |
| 6,512,961 | B1 * | 1/2003 | Fukaya | G05B 19/40937 700/174 |
| 6,895,297 | B2 * | 5/2005 | Shiba | G05B 19/409 700/172 |
| 8,036,770 | B2 | 10/2011 | Ichikawa | |
| 8,473,091 | B2 | 6/2013 | Nagano | |
| 8,934,998 | B1 * | 1/2015 | Boelkins | B23Q 11/1046 700/159 |
| 9,639,463 | B1 * | 5/2017 | Kankani | G06F 12/0261 |
| 2007/0091094 | A1 * | 4/2007 | Hong | G05B 19/41 345/474 |
| 2008/0103625 | A1 * | 5/2008 | Mochida | G05B 19/4067 700/174 |
| 2008/0249653 | A1 * | 10/2008 | Ichikawa | G05B 19/4155 700/189 |
| 2009/0228135 | A1 * | 9/2009 | Nakamura | G05B 19/409 700/173 |
| 2011/0208346 | A1 * | 8/2011 | Nagano | G05B 19/409 700/159 |
| 2014/0195037 | A1 * | 7/2014 | Nishibashi | G05B 19/4103 700/188 |
| 2015/0105900 | A1 | 4/2015 | Maki | |
| 2017/0300035 | A1 * | 10/2017 | Kawai | G05B 19/4068 |

FOREIGN PATENT DOCUMENTS

| | | |
|---|---|---|
| DE | 19824100 A1 | 12/1999 |
| DE | 102008001011 A1 | 11/2008 |
| DE | 102010043321 A1 | 5/2012 |
| JP | S5102008 A | 8/1982 |
| JP | H01276212 A | 11/1989 |
| JP | H02212905 A | 8/1990 |
| JP | 2008-257550 A | 10/2008 |
| JP | 2011-175316 A | 8/2011 |
| JP | 5357082 B2 | 12/2013 |

OTHER PUBLICATIONS

Chinese Office Action for Chinese Application No. 201610900080.1, with English translation, dated Sep. 27, 2018—12 pages.
German Examination Report for German Application No. 10 2016 012 334.6, dated Apr. 3, 2019, with translation, 16 pages.

* cited by examiner

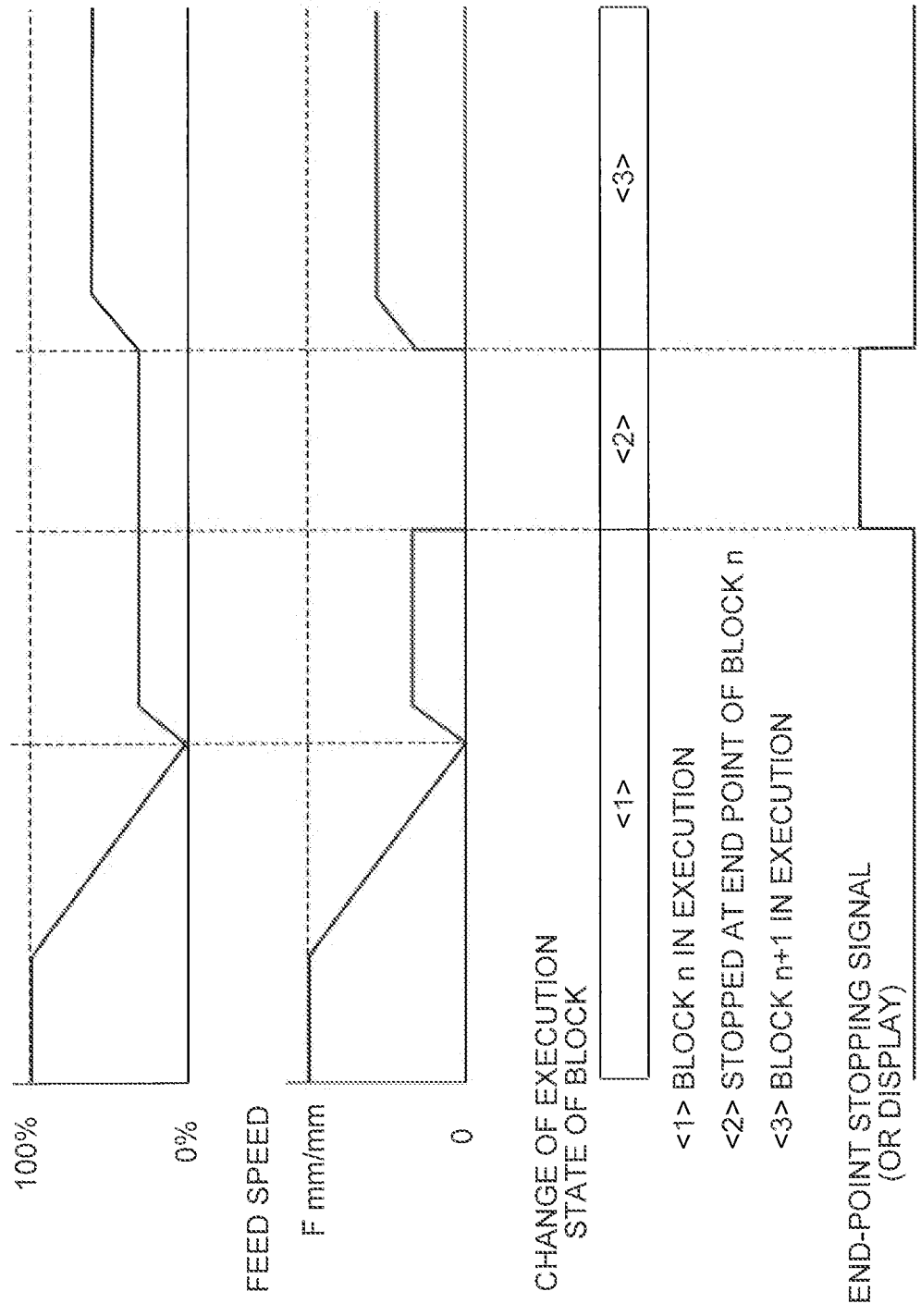

NUMERICAL CONTROLLER WITH PROGRAM CHECK FUNCTION BY OVERRIDE SWITCH

BACKGROUND OF THE INVENTION

Field of the Invention

The present invention relates to a numerical controller, and more particularly, to a numerical controller with a program check function by an override switch.

Description of the Related Art

In checking a command value of a block for error to achieve an operation check for a machining program, a single-block operation is performed on a numerical controller so that the machining program can be executed block by block to confirm the position of a machine and coordinate values at the end point of each block. In the single-block operation, one block is executed to stop the operation every time a start button is depressed. The rest of the program can be executed by depressing the start button again.

Moreover, in executing a program in which the operation is not confirmed, the start button may sometimes be depressed after an override switch is adjusted in advance to 0% for safety so that the machine operation can be confirmed while changing the override thereafter. The override switch is immediately reflected on the feed speed and can be stopped in the middle of the block if the override is set to 0%. Taking advantage of this characteristic, such usage is available that the speed is reduced to confirm the operation or the override is reduced to 0% to stop the operation to avoid interference if the program is found to be wrong or dangerous. In the program check work, as described above, the start button and the override switch may sometimes be jointly used.

Japanese Patent Applications Laid-Open Nos. 2008-257550 and 1-276212 disclose conventional techniques related to an operation check for a machining program of this type. According to these techniques, a plurality of blocks can be collectively executed in the operation check for the machining program. Moreover, Japanese Patent Application Laid-Open No. 2011-175316 discloses a technique in which a manual pulse generator is used in place of the start button so that a single-block operation for a machining program can be performed without operating both the start button and an override switch.

Since the single-block operation is stopped with every block, the start button must be depressed on each occasion. In the case of a program with a large number of blocks, therefore, the start button must be depressed many times. If the single-block operation is not used, in contrast, it is difficult to accurately confirm the coordinate values of the end point of the block and the machine position, although the start button need not be depressed many times. If the override switch is operated to set the override to 0%, thereby reducing the feed speed to 0, for example, the operation is inevitably stopped in the middle of each of many blocks. Thus, it is difficult to stop the operation just at the end point of the block.

Moreover, if the program includes those parts in which the operation is already confirmed, the end points of all the blocks need not always be confirmed and only a part in which the operation is not confirmed may sometimes be expected to be confirmed by the single-block operation. In order to perform the single-block operation for only the part of the program in this manner, a program stop (M00) and the like must be added before that part so that the rest of the program can be executed by canceling the single-block operation after the operation is switched to the single-block operation to confirm the operation when the operation is continuously performed to that part. To attain this, furthermore, it is necessary to insert the program stop (M00) and delete it after the confirmation, so that the operation is complicated.

SUMMARY OF THE INVENTION

Accordingly, the object of the present invention is to provide a numerical controller configured so that a machining program can easily be confirmed by operating only an override switch.

According to the present invention, a numerical controller is provided with a function means for control such that an operation is allowed to be suspended just at the end point of a block by operating only an override switch and that the rest of a program is executed without depressing a start button if the override switch is further changed from the suspended state. With this configuration, the end point position of the block can be confirmed without depressing the start button many times unlike the case of a single-block operation. Alternatively, the operation may be prevented from being stopped at the end point of the block unless the override switch is operated so that the end point of the block for only a part of the program can be confirmed.

A numerical controller according to the present invention, which runs a machine according to a program, comprises an override input unit configured to accept an operation for an override value by an operator, an override monitoring unit configured to detect the operation for the override value by the override input unit and output a notification based on the detected operation, and an execution block control unit configured to control suspension and resumption of the run based on the notification output from the override monitoring unit. The override monitoring unit outputs a notification of an end-point stop request if a first operation pattern is detected from the override input unit during the run, and the execution block control unit performs control for suspending the run at the end point of a currently running block of the machining program on receiving the notification of the end-point stop request.

The override monitoring unit may be configured to stop the output of the notification of the end-point stop request if a second operation pattern is detected from the override input unit during the suspension, and the numerical controller may be configured to perform control for resuming the run according to the machining program when the execution block control unit detects the stoppage of the output of the notification of the end-point stop request during the suspension.

Moreover, the override monitoring unit may be configured to output the notification of the end-point stop request when it is detected that a predetermined parameter and/or a predetermined signal is set to a preset predetermined state during the run, and the numerical controller may be configured to perform the control for suspending the run at the end point of the currently running block of the machining program when the execution block control unit receives the notification of the end-point stop request.

Moreover, the override monitoring unit may be configured to output the notification of the end-point stop request during the run if the currently running block is shorter than a preset predetermined block length or if the execution time of the currently running block is shorter than a preset predetermined execution time, and the numerical controller may be configured to perform control for suspending the run at the end point of the currently running block of the machining program when the execution block control unit receives the notification of the end-point stop request.

Furthermore, the override monitoring unit may be configured to output a notification of a next-block end-point stop request during the run if a third operation pattern is detected from the override input unit, and the numerical controller may be configured to perform the control for suspending the run at the end point of a block next to the currently running block of the machining program when the execution block control unit receives the notification of the next-block end-point stop request.

According to the present invention, such an operation as a single-block operation that involves confirmation of the end point of a block and a normal operation in which blocks are continuously executed can be switched to and from each other by operating only the override switch. Thus, those parts of the program in which the operation is already confirmed are continuously executed, for example, so that only those parts which require confirmation can be executed while stopping the operation at the end point in the same manner as in the case of a single block. Moreover, this operation can be achieved by operating only the override switch without using a start button, so that the operability at the time of program check is improved.

BRIEF DESCRIPTION OF THE DRAWINGS

FIG. 3 is a timing chart showing an example of operation control by the override switch operation according to the present invention;

DETAILED DESCRIPTION OF THE PREFERRED EMBODIMENTS

Embodiments of the present invention will now be described with reference to the accompanying drawings.

Figure 1A:
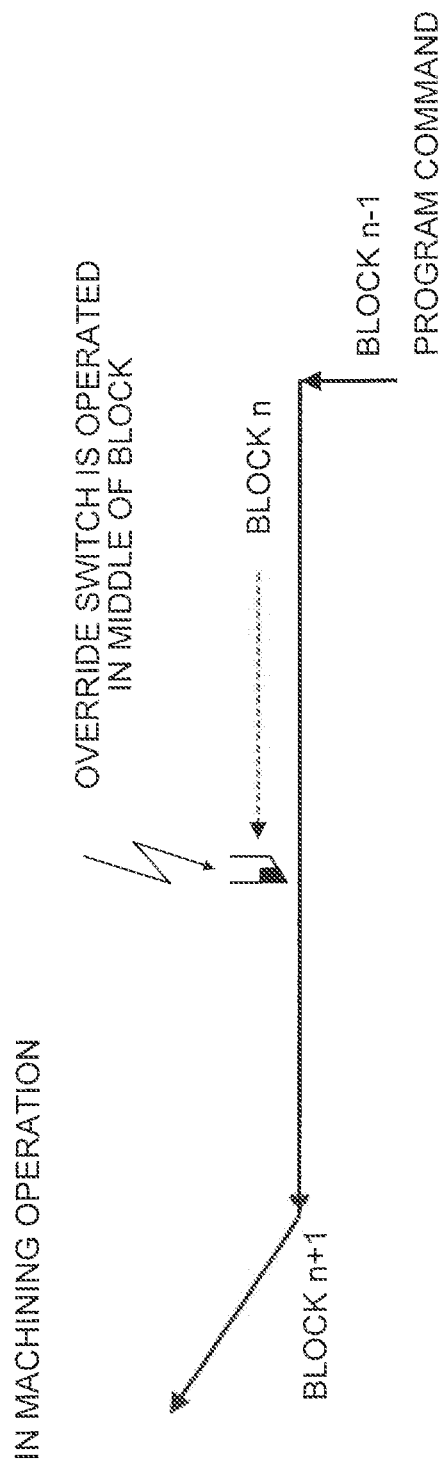
FIG. 1A is a diagram illustrating suspension of a machining operation by an override switch operation and illustrates how a numerical controller of the present invention continues execution of a currently running block when it is detected that a predetermined operation of an override switch is performed by an operator during the execution of a machining program.
Figure 1B:
FIG. 1B is a diagram illustrating the suspension of the machining operation by the override switch operation and illustrates how the execution of the machining program is suspended when after having passed through a state of FIG. 1A, the execution of the currently running block is finished.

FIGS. 1A, 1B, 2A and 2B are diagrams illustrating an outline of operation control by an override switch operation in a numerical controller of the present invention. When the numerical controller of the present invention detects that a predetermined operation of an override switch is performed by an operator during the execution of a block (block n in the drawing) of a machining program, as shown in FIG. 1A, it continues the execution of the currently running block. When the execution of the currently running block is finished, the execution of the machining program is suspended, as shown in FIG. 1B.

Figure 2A:
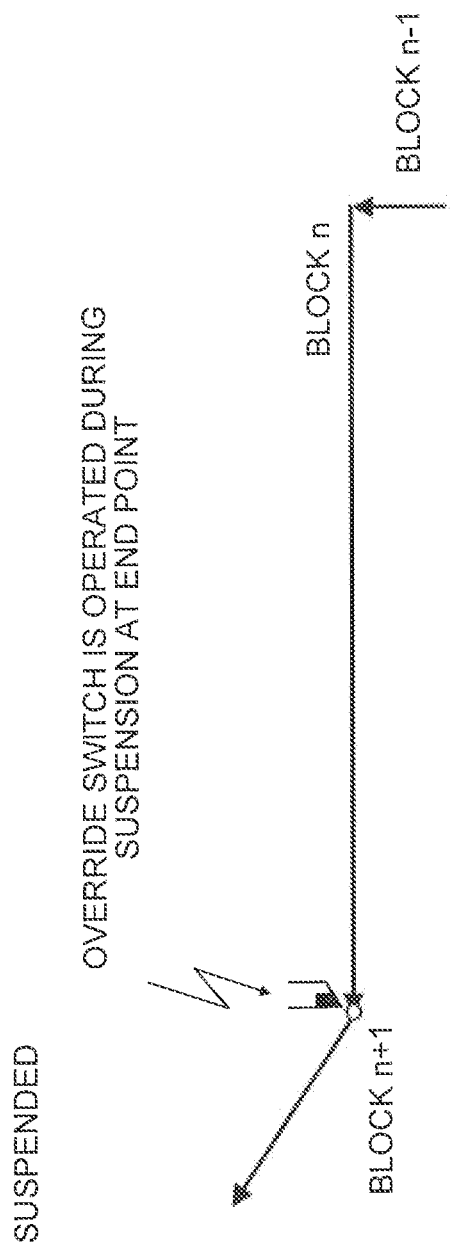
FIG. 2A is a diagram illustrating resumption of the machining operation by the override switch operation and illustrates how the numerical controller of the present invention detects that the predetermined operation of the override switch is performed by the operator during the suspension of the machining operation according to the machining program.
Figure 2B:
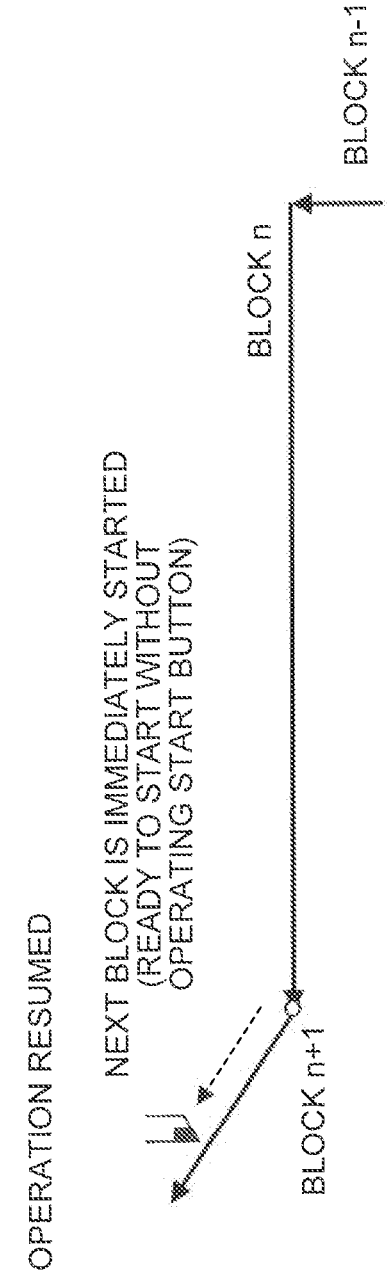
FIG. 2B is a diagram illustrating how the machining operation according to the machining program is resumed starting from the next block (block n+1 in the drawing) after having passed through a state of FIG. 2A.

On the other hand, when the numerical controller of the present invention detects that the predetermined operation of the override switch is performed by the operator while the operation according to the machining program is suspended, as shown in FIG. 2A, it immediately resumes the operation according to the machining program starting from the next block (block n+1 in the drawing), as shown in FIG. 2B.

FIG. 3 is a timing chart showing temporal relationships between the override switch operation during a machining operation according to the machining program, the feed speed of the axis of a machine during the control, changes of the running state of blocks of the machining program, and change of an end-point stopping signal indicative of a suspended state of the axis. When the operator performs the predetermined operation of the override switch (operation to increase an override value immediately after temporarily reducing it to 0% as in FIG. 3) during the execution of the block n (<1>), in the machining operation according to the machining program, the execution of the block n is continued, although the feed speed changes correspondingly. When the axis reaches the end point of the block n, thereafter, the machining operation is suspended and the movement of the axis stops (<2>). The end-point stopping signal is output during the suspension. If the operator operates the override switch to change the override value thereafter, the machining operation is resumed starting from the block n+1 and the output of the end-point stopping signal is stopped (<3>). The feed speed of the axis after the resumption is determined based on a command value for the block n+1 and the value of the override switch.

The operation of the override switch for suspending the machining operation may be any operation that can be distinguished from an operation for changing a conventional override value during the machining operation. Alternatively, a plurality of operations may be detected as the predetermined operation.

The present invention is applicable to a button-type override switch and the like with buttons capable of dealing with a plurality of override values, as well as to a handle-type or dial-type override switch. In this case, an operation (e.g., to depress one and the same button twice in a short time or hold down the button for a certain time in the case of the button type) that is not performed when the switch is normally operated is adopted as the predetermined operation.

Moreover, a predetermined operation for the resumption of the machining operation may be an operation different from the predetermined operation for suspending the machining operation. For example, an operation for suspending the machining operation during the execution of a block may be an operation to increase the override value immediately after temporarily reducing it to 0%, and the predetermined operation for resuming the machining operation during the suspension of the machining operation may be an operation to simply change the override switch value.

Figure 4:
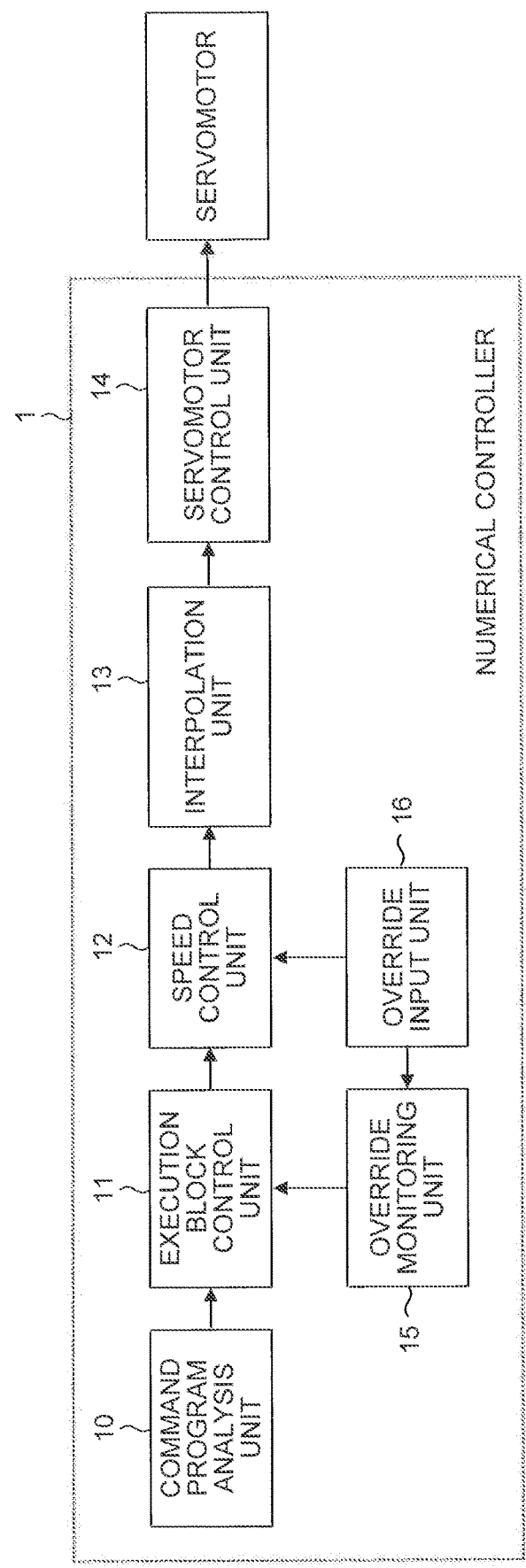
FIG. 4 is a functional block diagram of a numerical controller according to an embodiment of the present invention.

FIG. 4 is a functional block diagram of a numerical controller according to an embodiment of the present invention.

A numerical controller 1 of the present invention comprises a command program analysis unit 10, execution block control unit 11, speed control unit 12, interpolation unit 13, servomotor control unit 14, override monitoring unit 15, and override input unit 16.

The command program analysis unit 10 sequentially reads and analyzes the blocks of the machining program from programs stored in a memory (not shown), creates movement command data for commanding the movement of each axis based on the result of the analysis, and outputs the created movement command data to the execution block control unit 11.

The execution block control unit 11 performs suspension of machining program operation based on a notification from the override monitoring unit 15 and operation resumption control. The execution block control unit 11 of the present embodiment suspends the machining operation at the end point of the currently running block when it receives an end-point stop request from the override monitoring unit 15, and it resumes the machining operation starting from the block next to the suspended block when the end-point stop request from the override monitoring unit 15 is stopped.

The speed control unit 12 calculates the feed speed of the axis commanded by the movement command data according to an override signal input through the override input unit 16. For example, the movement of the axis is stopped if the override value is 0%, the axis is operated at a feed speed specified by the movement command data if the override value is 100%, and the axis is operated at a half feed speed if the override value is 50%.

The interpolation unit 13 generates interpolation data based on interpolation calculation of points on a command path commanded by the movement command data with an interpolation period, according to the speed determined by the speed control unit 12. Moreover, the interpolation data is subjected to post-interpolation acceleration/deceleration processing, the speed of each drive axis is calculated for each interpolation period, and the resulting data is output to the servomotor control unit 14.

The servomotor control unit 14 controls a drive unit for each axis of the machine as a controlled object based on the output of the interpolation unit 13.

The override monitoring unit 15 monitors whether or not the above-described predetermined operation is performed for the override signal input through the override input unit 16, and notifies the execution block control unit 11 of the result. During the machining operation, the override monitoring unit 15 monitors a predetermined operation that requires suspension of the machining operation. When this predetermined operation is detected, the override monitoring unit 15 notifies the execution block control unit 11 of the end-point stop request. Moreover, during the suspension of the machining operation, the override monitoring unit 15 monitors a predetermined operation that requires resumption of the machining operation. When this predetermined operation is detected, the override monitoring unit 15 stops the notification of the end-point stop request for the execution block control unit 11.

The override input unit 16 comprises the override switch and a signal transmission mechanism and serves to convert the operator's override switch operation into an override signal and output it to the override monitoring unit 15 and the speed control unit 12.

Figure 5:
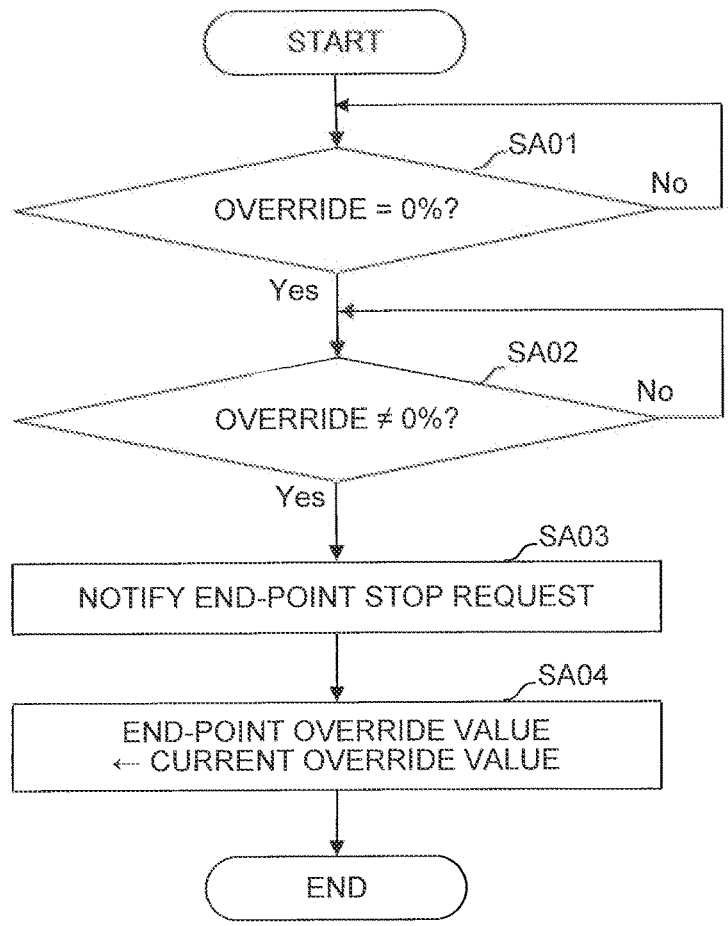
FIG. 5 is a schematic flowchart of monitoring processing related to suspension during the machining operation performed on an override monitoring unit according to the embodiment of the present invention.

FIG. 5 is a schematic flowchart of monitoring processing related to suspension during the machining operation performed on the override monitoring unit 15. This flowchart shows processing for detecting the "operation to increase the override value immediately after temporarily reducing it to 0%" as the predetermined operation that requires suspension of the machining operation. Moreover, this flowchart is started when the override value is set to a value other than 0%.

[Step SA01] The change of the override signal is monitored and it is determined whether or not the override value is changed to 0% from a value other than 0%. If the override value is changed to 0%, the processing proceeds to Step SA02. If not, the monitoring processing is continued.

[Step SA02] After the change of the override value to 0% is detected, it is determined whether or not the override value is changed to a value other than 0%. If the override value is changed from 0% to a value other than 0%, the processing proceeds to Step SA03. If not, the monitoring processing is continued.

[Step SA03] It is determined that the predetermined operation is performed so that the end-point stop request can be notified to the execution block control unit 11, whereupon this processing ends.

[Step SA04] The current override value is temporarily stored as an end-point override value.

Figure 6:
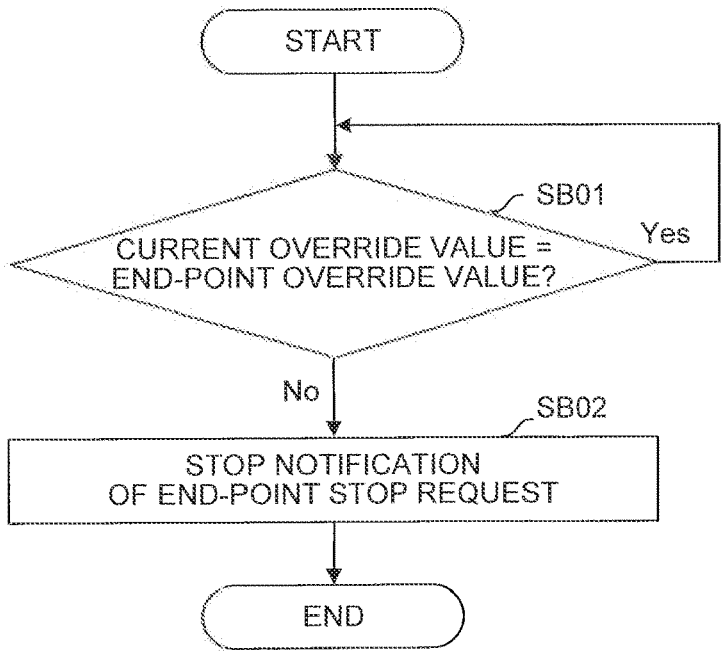
FIG. 6 is a schematic flowchart of monitoring processing related to operation resumption during the suspension of the machining operation performed on the override monitoring unit according to the embodiment of the present invention.

FIG. 6 is a schematic flowchart of monitoring processing related to operation resumption during the suspension of the machining operation performed on the override monitoring unit 15. This flowchart shows processing for detecting the "operation to change the override value" as the predetermined operation that requires the operation resumption during the suspension of the machining operation. Moreover, this flowchart is started during the suspension of the machining operation.

[Step SB01] The change of the override signal is monitored and it is determined whether or not the override value is changed from the end-point override value stored in Step SA04. If the override value is changed, the processing proceeds to Step SB02. If not, the monitoring processing is continued.

[Step SB02] It is determined that the predetermined operation is performed and the notification of the end-point stop request to the execution block control unit 11 is stopped, whereupon this processing ends.

Figure 7:
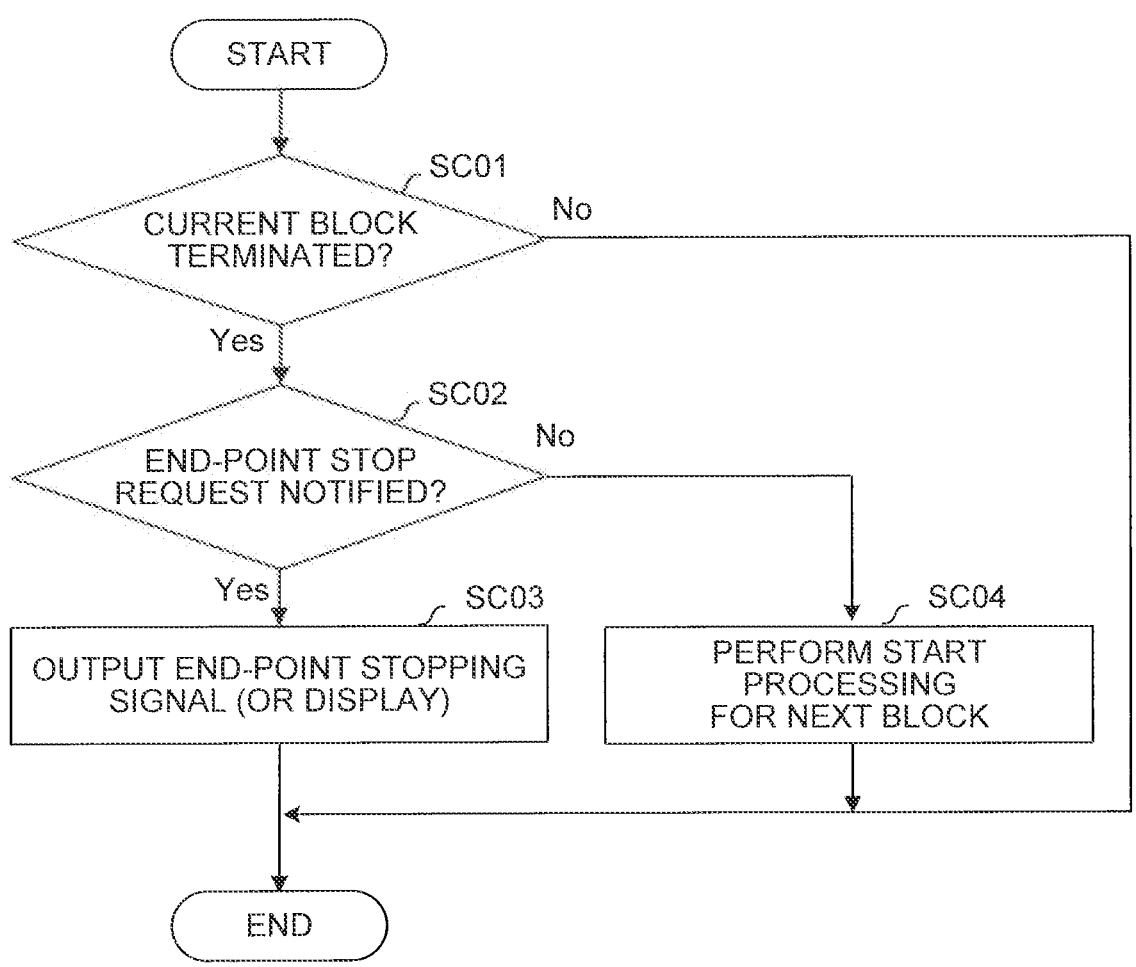
FIG. 7 is a schematic flowchart of processing related to suspension during the machining operation performed on an execution block control unit according to the embodiment of the present invention.

FIG. 7 is a schematic flowchart of processing related to suspension during the machining operation performed on the execution block control unit 11. This processing is performed for each control period of the numerical controller 1 during the machining operation according to the machining program.

[Step SC01] It is determined whether or not axis control based on the currently running block is terminated. If the control is terminated, the processing proceeds to Step SC02. If not, this processing in this period ends.

[Step SC02] It is determined whether or not the end-point stop request from the override monitoring unit 15 is notified. If the end-point stop request is notified, the processing proceeds to Step SC03. If not, the processing proceeds to Step SC04.

[Step SC03] Display processing indicative of the output of the end-point stopping signal and end-point stopping is performed, whereupon this processing in this period ends.

[Step SC04] Start processing (the rest of the machining operation) for the next block is performed, whereupon this processing in this period ends.

Figure 8:
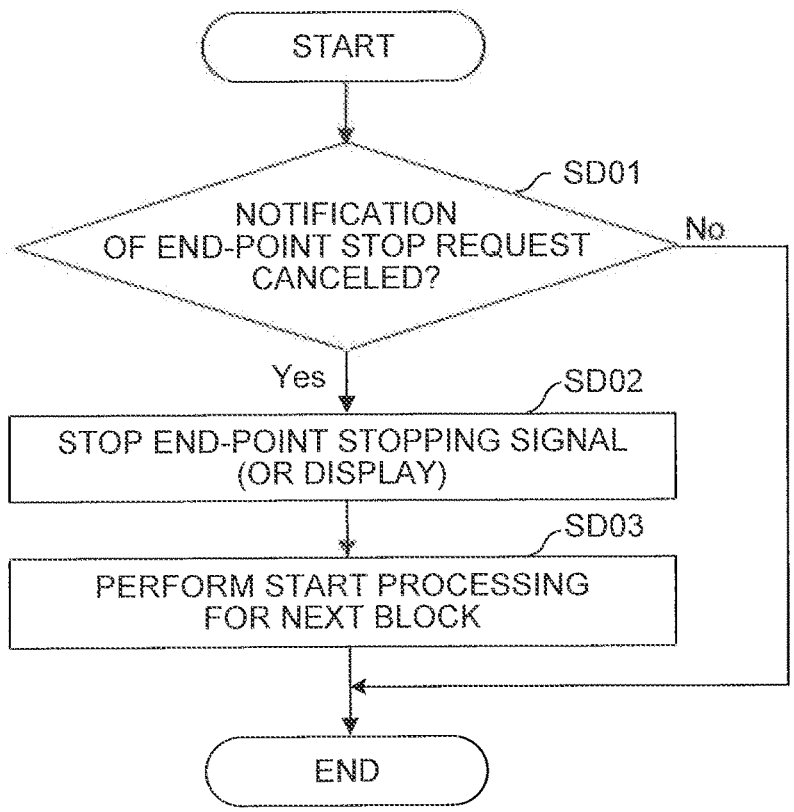
FIG. 8 is a schematic flowchart of processing related to operation resumption during the suspension of the machining operation performed on the execution block control unit according to the embodiment of the present invention.

FIG. 8 is a schematic flowchart of processing related to operation resumption during the suspension of the machining operation performed on the execution block control unit 11. This processing is performed for each control period of the numerical controller 1 during the suspension of the machining operation.

[Step SD01] It is determined whether or not the notification of the end-point stop request from the override monitoring unit 15 is canceled. If the notification of the end-point stop request is canceled, the processing proceeds to Step SD02. If the notification is not canceled, this processing in this period ends.

[Step SD02] Display stoppage indicative of stoppage of the output of the end-point stopping signal and the end-point stopping is performed.

[Step SD03] Start processing (resumption of the machining operation) for the next block is performed, whereupon this processing in this period ends.

In the numerical controller of the present embodiment constructed in this manner, such an operation as a single-block operation that involves confirmation of the end point of a block and a normal operation in which blocks are continuously executed can be switched to and from each other by operating only the override switch. The operator continuously executes those parts of the program in which the operation is already confirmed, for example, so that he/she can execute only those parts which require confirmation while stopping the operation at the end point in the same manner as in the case of a single block. Moreover, this operation can be achieved by operating only the override switch without using a start button, so that the operability at the time of program check can be improved.

While an embodiment of the present invention has been described herein, the invention is not limited to the above-described embodiment and may be suitably modified and embodied in various forms.

In connection with the above-described embodiment, for example, the function of switching the operation by the override switch operation has been described. If the block concerned is too short, however, it may possibly be passed before the override switch is operated based on this function alone. To overcome this situation, a condition stop mode may possibly be provided such that the operation is stopped without operating the override switch when the block end point is reached.

In the condition stop mode, a parameter or the state of a switch (signals) on a control panel may be monitored so that the operation can be suspended at the end point of the currently running block if the suspension is commanded by the parameter or the signal state. Alternatively, a predetermined block length and a predetermined block execution time may be set in advance by parameters so that the operation can be suspended at the end point of a block with its block length or block execution time shorter than the set value. Moreover, these configurations may be combined so that the operation can be suspended at the end point of the block with its block length or block execution time shorter than the value set as a parameter only when the suspension is commanded by the parameter or the signal state.

With these configurations, the operation can be achieved by checking the parameter, the state of the switch (signal) on the control panel, or the block length or execution time and notifying the end-point stop request, as well by monitoring the change of the override signal in the override monitoring unit.

Figure 9:
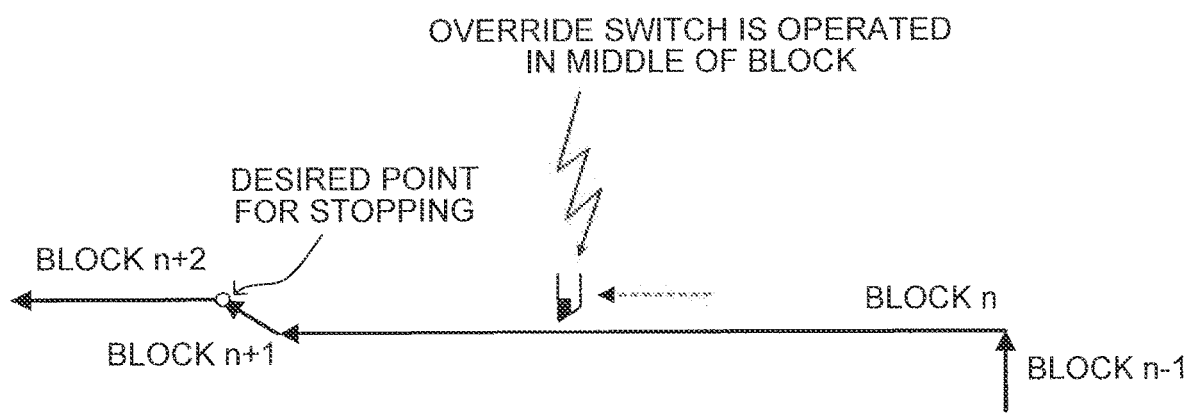
FIG. 9 is a diagram illustrating another embodiment of the present invention.

In the embodiment described above, moreover, the machining operation is suspended at the end point of the currently running block when the predetermined operation is detected during the machining operation. Alternatively, however, a plurality of distinguishable operations may be configured to be detected as the predetermined operation so that the machining operation can be suspended in different methods depending on the type of the detected operation. If the "operation to increase the override value immediately after temporarily reducing it to 0%" is detected during the machining operation, for example, the machining operation is suspended at the end point of the currently running block. If an "operation to repeat, twice in a short time, the operation to increase the override value immediately after temporarily reducing it to 0%" is detected, the machining operation may possibly be suspended at the end point of the block next to the currently running block. Thus, if the machining operation is expected to be suspended at the end point of the short block n+1, as shown in FIG. 9, it can be suspended at the end point of the target block n+1 by performing the "operation to repeat, twice in a short time, the operation to increase the override value immediately after temporarily reducing it to 0%" in the preceding long block n without being forced to perform the operation in a hurry during the execution of the block n+1.

While embodiments of the present invention have been described herein, the invention is not limited to the above-described embodiments and may be suitably modified and embodied in various forms.

The invention claimed is:

1. A numerical controller which runs a machine according to a program, the numerical controller comprising:
   a processor configured to:
      accept an operation for an override value input by an operator via an override switch;
      control a sending speed of the machine based on the operation;
      detect the operation for the override value and output a notification based on the detected operation;
      control suspension and resumption of a run of the machining program based on the notification output;
      output a notification of an end-point stop request when a first operation pattern for increasing the override value immediately after temporarily reducing the override value to 0% is input by the operator via the override switch during the run prior to an end of the machining program;
      in response to receiving the notification of an end-point stop request,
      suspend the run at the end point of a currently running block of the machining program, and when a second operation pattern for changing the override value is input by the operator via the override switch while the run is suspended, restart the run at the start point of a subsequent block of the machining program after the currently running block without requiring use of a restart switch; and in response to not receiving the notification of an end-point stop request, automatically continue the run to a plurality of subsequent blocks of the machining program after the currently running block reaches the end point.

2. The numerical controller according to claim 1, wherein the processor is further configured to:

stop the output of the notification of the end-point stop request if a second operation pattern is detected during the suspension; and perform control for resuming the run according to the machining program when the stoppage of the output of the notification of the end-point stop request is detected during the suspension.

3. The numerical controller according to claim 1, wherein the processor is further configured to:

output the notification of the end-point stop request when it is detected that a predetermined parameter and/or a predetermined signal is set to a preset predetermined state during the run; and perform the control for suspending the run at the end point of the currently running block of the machining program based on receiving the notification of the end-point stop request.

4. The numerical controller according to claim 1, wherein the processor is further configured to:

output the notification of the end-point stop request during the run if the currently running block is shorter than a preset predetermined block length or if the execution time of the currently running block is shorter than a preset predetermined execution time; and perform the control for suspending the run at the end point of the currently running block of the machining program based on receiving the notification of the end-point stop request.

5. A numerical controller which runs a machine according to a program, the numerical controller comprising:

a processor configured to:

accept an operation for an override value by an operator;

control a sending speed of the machine based on the operation;

detect the operation for the override value and output a notification based on the detected operation;

control suspension and resumption of the run based on the notification output;

output a notification of an end-point stop request if a first operation pattern is detected during the run;

suspend the run at the end point of a currently running block of the machining program based on receiving the notification of an end-point stop request;

output a notification of a next-block end-point stop request during the run if a second operation pattern is detected; and perform the control for suspending the run at the end point of a block next to the currently running block of the machining program based on receiving the notification of the next-block end-point stop request.

* * * * *